United States Patent
Ala-Kleemola et al.

(10) Patent No.: US 8,112,515 B2
(45) Date of Patent: Feb. 7, 2012

(54) REPUTATION MANAGEMENT SYSTEM

(75) Inventors: Timo Ala-Kleemola, Tampere (FI); Sami Tolvanen, Tampere (FI)

(73) Assignee: Against Intuition Oy, Helsinki (FI)

( * ) Notice: Subject to any disclaimer, the term of this patent is extended or adjusted under 35 U.S.C. 154(b) by 580 days.

(21) Appl. No.: 11/802,739

(22) Filed: May 24, 2007

(65) Prior Publication Data

US 2007/0294339 A1    Dec. 20, 2007

(30) Foreign Application Priority Data

May 26, 2006 (FI) ................................. 20060518
Jul. 14, 2006 (FI) ................................. 20060686

(51) Int. Cl.
*G06F 15/173* (2006.01)

(52) U.S. Cl. ........................................ 709/224; 709/203

(58) Field of Classification Search ................ 707/3, 10, 707/102; 705/26, 12, 27; 709/203, 224; 434/236

See application file for complete search history.

(56) References Cited

U.S. PATENT DOCUMENTS

| | | | |
|---|---|---|---|
| 2004/0139192 A1* | 7/2004 | Spaid | 709/224 |
| 2006/0026123 A1* | 2/2006 | Moore et al. | 707/2 |
| 2006/0095586 A1* | 5/2006 | Adelman et al. | 709/245 |
| 2006/0253578 A1* | 11/2006 | Dixon et al. | 709/225 |

\* cited by examiner

*Primary Examiner* — Joon H Hwang
*Assistant Examiner* — Joel Mesa
(74) *Attorney, Agent, or Firm* — Squire Sanders (US) LLP

(57) ABSTRACT

A reliable reputation management system in which the users of the services vote for reputation. The votes are collected to a reputation server which computes reputation for specific services. When a large group of users have voted, the result will be reliable. The reputation server is independent in order to guarantee objective reputation management. If the user does not vote but keeps using the service, the system will compute a vote by itself. The user may change the vote later.

5 Claims, 4 Drawing Sheets

REPUTATION MANAGEMENT SYSTEM

FIELD OF THE INVENTION

The invention relates to web application reliability rating.

BACKGROUND OF THE INVENTION

Recently Internet shopping has grown in rapid pace. A lot of customers are buying merchandise from Internet stores. Naturally this has increased the amount of Internet stores. Customers are used to search the cheapest price from the Internet. By finding the cheapest store they save a lot of money. However, there are always some concerns about the reliability of the store. This is particularly problem when the customer finds a new store with the cheapest price. However, if the customer has not used or does not know anyone who has used the store, he/she cannot know if the store is reliable and what is the quality of service. This is particularly problem in the internet stores as it is easy to design a store that looks credible. Sometimes the designs of credible stores are even copied.

To solve the problems mentioned above several different solutions have been developed. For example, warning systems and software for detecting untrustworthy internet pages have been developed. The warning software is arranged to detect suspicious elements and network addresses from the pages that the user is accessing. This type of software is usually automatic and it downloads updates from the software provider. Some products have also a feedback possibility. A drawback of this solution is that it is arranged to detect if the webpage is secure or not. Suspicious webpages are then reported to the user. However, this does not give any indication of the reliability of the store but only the security of the webpage.

In order to provide further information social networks and automatic systems for have been developed. In social networks the members of networks collect recommendations to the network. The drawback of a social network is that the user must first find out a social network that is extensive enough. Automatic systems are based on technical measurements. For example, if a certain store gets a lot of traffic, it is usually a sign of good and trusted store. Similar systems can be internal systems within certain site. For example, in auction websites the users can give opinions regarding to sellers and buyers. However, as these opinions are not anonymous, the reliability can be affected because as the users might not give negative feedback easily as the user giving the feedback might be afraid of revenge feedback.

In peer to peer networking distributed reliability systems are introduced. In this kind of systems the users give feedback that is shared among the network. The reliability computation is distributed to the users themselves and thus, the reliability of the computing itself is in doubt. Thus, there is a need for a solution that provides security, reliability and other information to users of the network so that the user can have a secure and reliable service in the network.

SUMMARY OF THE INVENTION

The invention discloses a reliable reputation management system in which the users of the services vote for reputations. The votes are collected to a reputation server which computes reputation for specific services. When a large group of users have voted, the result will be reliable. The reputation server is independent in order to guarantee objective reputation management. Different users might have different weights in voting. For example, if a user has a long history in voting, his/her vote weighs more. Also, if the user continues using the site but does not vote, the system votes automatically. The user may change his/her vote later, for example, because of the change in the quality. The automatic vote can be positive, neutral or negative. For example, it is possible to configure the system so that very frequent rate of visits give positive vote but normal regular rate of visits give only neutral vote, which is typically the current reputation of the site.

In an embodiment the reliability of the votes is time dependent. The recent votes are considered to be more reliable than older votes. Thus, each of the votes have been equipped with the time stamp that is touched every time the user is revisiting the site. However, it is possible to configure the system so that the vote is considered to be more reliable if the user has actively changed or confirmed the previous vote compared to situation in which the previous vote has been touched by the automatic voting system.

Thus, the vote typically comprises an opinion, a time stamp and the reputation of the voter. The weight of the opinion reduces as a function of time. This guarantees reliable votes. These votes are used for computing the reputation estimate. However, it is possible that only a portion of the votes will be used in the computing. This allows computing the reputation estimate based on the votes from the most reliable users and guarantees reliable reputation estimates.

The method according to the invention is initiated by choosing a site to be contacted and the contacting may be initiated. The processing is continued by contacting a reputation server and retrieving reputation information assigned to the web service. Lastly the reputation information to the user is displayed to the user. Typically this is implemented by a software product that is integrated to the www-browser. After using the service the user can give a vote or change a previous vote, however, this is not necessary. If the retrieved reputation information indicates a suspicious site, the software will display a warning message to the user. Thus, the benefit of the invention is allowing the users to access reliable services.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
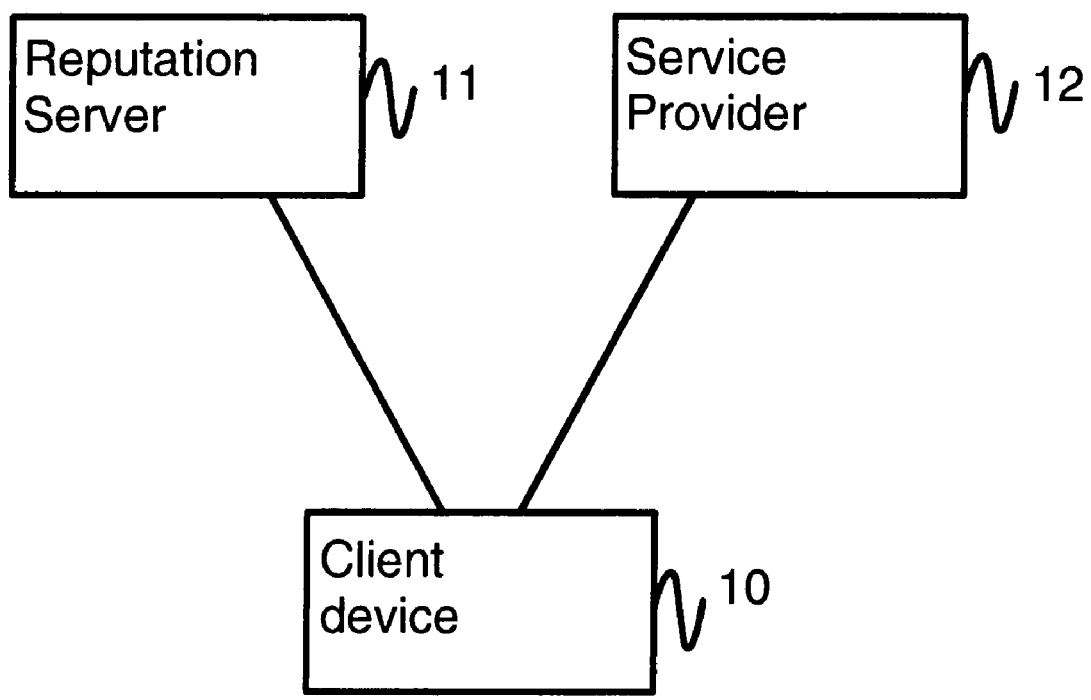
FIG. 1 is a block diagram of an example embodiment of the present invention.

FIG. 1 is a block diagram of an example embodiment of the present invention. The present invention discloses a usable and reliable reputation system for different services that are implemented in the World Wide Web. The present invention overcomes the drawbacks of the prior art systems by providing a new system for providing reliable reputation system.

The basic principle of the present invention is that the users of the web services can vote about the quality of the services. This is implemented by using a trusted third party so that the users will connect to the trusted third party when they want to know the reputation of certain service. Typically this service is a web store that the user has not used before. However, the present invention is not limited to stores but it is suitable for any kind of web services. The system according to the present invention comprises a client device 10, a trusted third party 11 and a service provider 12.

Figure 2:
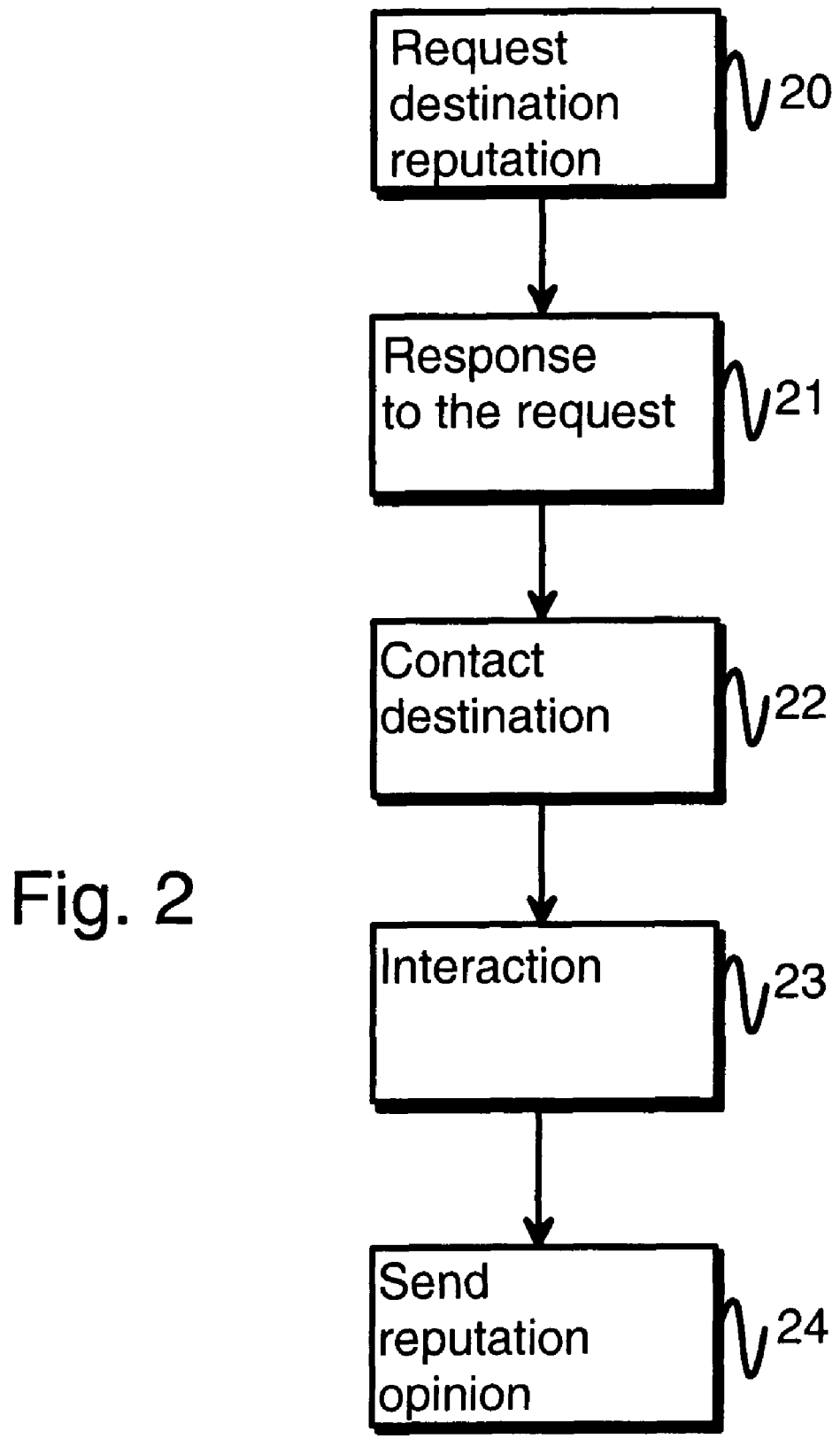
FIG. 2 is a flow chart of an example embodiment of the present invention.

FIG. 2 is a flow chart of an example embodiment according to the present invention. In the example of Figure, it is assumed that first the user decides the service he/she is going to use. The first step of the invention is then to request reputation information for the requested site, step 20. As a response to the request the reputation server returns a reputation value and shows the value to the customer, step 21. If the customer decides that the reputation value is good enough, he/she can proceed to the actual service, step 22. The service itself is used conventionally as the present invention does not change the content of the service, step 23. After the interaction with the service provider, the reputation server requests for reputation estimate. Thus, the amount of votes increases and the reputation estimate gets more reliable. However, voting for the reputation is not necessary. The system can be configured so that if the user does not vote but uses the service regularly, the automatic voting system decides that the user accepts the quality of the service. Thus, a positive vote will be given for that site.

Figure 3:
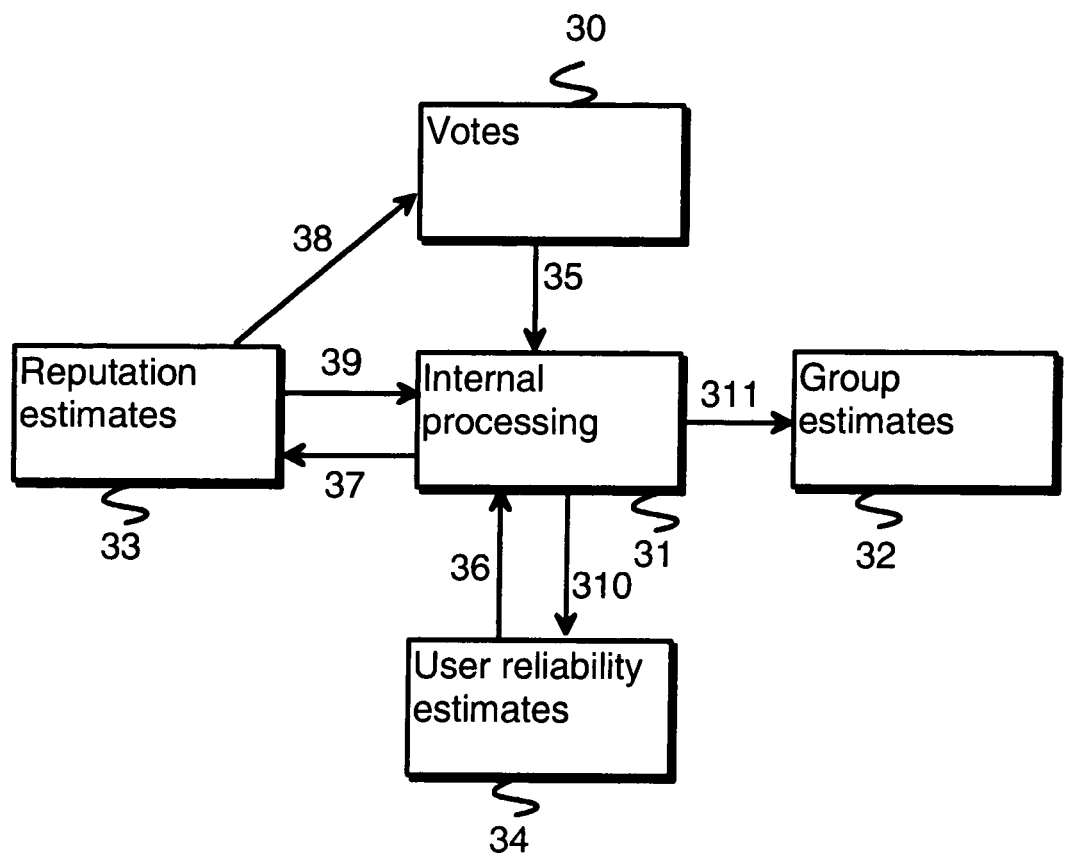
FIG. 3 is a diagram of the internal configuration of an example implementation presented in figure, and FIG. 4 a message sequence chart illustrating the interaction with the components of the system in one embodiment of the invention.

FIG. 3 discloses a diagram of the internal configuration of an example implementation presented in FIG. 2. According to the invention it is important how the reputation information is stored into the reputation server, which is a trusted third party. The third party is totally independent and does not have any connections to the websites that are rated in the system. According to the FIG. 3, first votes 30 from the users will be received as indicated by arrow 35. These votes can be from any user who has used the website and installed the functionality of the present invention. After receiving the vote the reliability of the user 34 is retrieved as indicated by arrow 36. This is important factor in increasing the reliability as the reliability of the customers may vary. For example, the customers who use a lot of different services are considered to be more reliable than a customer who does not use services as extensively. Also a longer history in voting suggests more reliability than new users. The voting history does not mean only the amount of the votes but the content of the actual votes. The quality of the votes is considered to be an important source of information when determining the reliability of the user.

After receiving the reliability of the user, the internal processing section 31 proceeds to computing of reputation estimates 33 as indicated by arrow 37. Then the reputation estimates 33 are combined with votes 30 as indicated by arrow 38. This is for ensuring that the votes and the estimates are assigned to a certain service instead of an individual network address. For example, a website could have two Internet addresses www.website.com and www2.website.com. These two relate to the same service even if they have different addresses. Thus, the information must be combined. Then reputation estimates 33 and/or votes 35 are used for refining the reliability of the user, as indicated by arrows 39 and 310. Lastly, group specific reputation estimates 32 are computed as indicated by arrow 311. These estimates are computed by forming groups to which the users are divided based on the behavior. Thus, the users thinking similarly with each other are connected in order to provide more reliable estimates.

Figure 4:
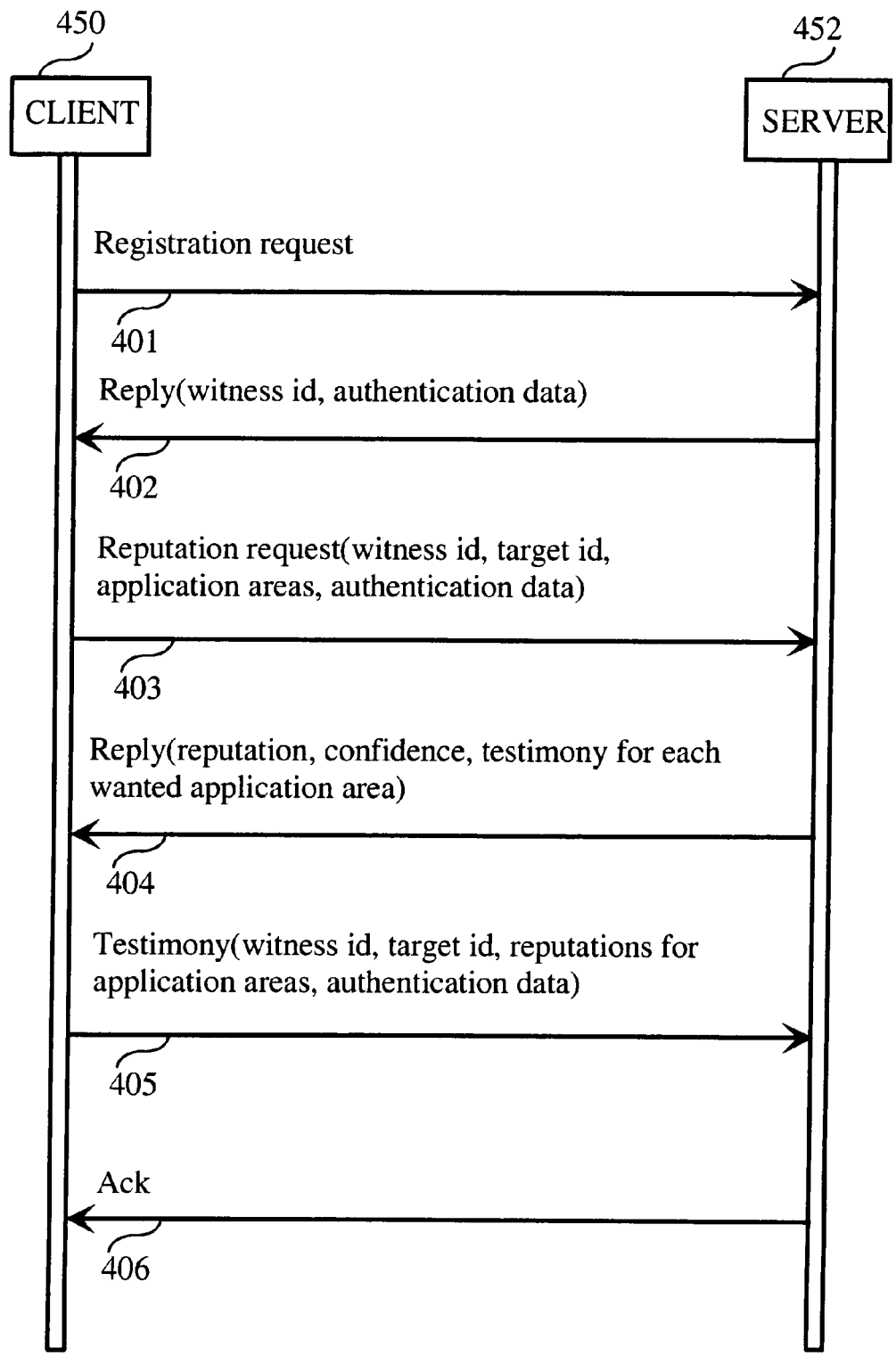

FIG. 4 is a message sequence chart illustrating the interaction with the components of the system in one embodiment of the invention. In FIG. 4 there is a client device 450 and a reputation server 452. In the following is listed a few terms associated with the embodiment described in FIG. 4.

A network is, for example, any system of electronic devices connected by a wired or wireless communication path. For example, computers connected to the Internet or cellular phones connected to a telephone system. A target is, for example, any uniquely identifiable entity in a network. For example, it may be an Internet server with a Domain Name System (DNS) name or a cellular phone with a phone number. A reputation is, for example, an overall quality or character of a target as seen or judged by other entities in general. Reputation is, for example, expressed as an integer value ranging from 0 to 100, with 0 marking the worst reputation and 100 the best. Confidence is, for example, an estimated certainty of a computed reputation for a target. It is expressed as an integer value ranging from 0 to 100, with 0 marking the worst confidence and 100 the best. An application area is, for example, the scope of a reputation. For example, it is the reputation as a content provider or the reputation as a business partner. A witness may be any uniquely identifiable entity in a network capable of judging reputation. For example, it may be a registered user of an Internet service. A testimony is, for example, a witness's firsthand authentication of a target's reputation in an application area. It is expressed as a reputation value ranging from 0 to 100. The witness may give any number of testimonies for the target, but only the latest testimony in an application area is considered valid. An automatic testimony is, for example, an estimated testimony for a target's reputation in an application area derived from withness's observed behavior. An automatic testimony is applied only if the witness has not given a testimony for the target, and is discarded if the witness gives a testimony at a later time.

Client device 450 is any electronic device connected to a network and in the possession of a witness, which is capable of communicating with a reputation server. Client device 450 provides an interface for the witness to access reputation data and to submit testimonies. Typically, the witness communicates with a target over the network, possibly in order to access a network service the target provides. When activated, client device 450 sends a request to the reputation server for the target's reputation in one or more application areas before or during the transaction with the target. Upon making the request to the reputation server, client device 450 receives reputation data as a tuple {reputation, confidence, testimony} for each requested application area. Testimony data is omitted if the witness has not submitted a testimony yet. The purpose of client device 450 is to use the received reputation data to aid the user. For example, it may visualize the data to provide information or warn the user before starting a transaction with the target, or even block or abort the transaction if the target's reputation is not satisfactory.

Once the transaction with the target has been completed or at any time during the transaction, the witness may submit a testimony based on the experience. Client device 450 transmits the testimony to the reputation server. Testimonies are strongly authenticated to preserve the integrity and authenticity of the data. Also, parts of the testimony or all of it may be encrypted to preserve confidentiality.

For example, client device 450 can be implemented as one or more software components, which are integrated to a web browser, running on a computer, a PDA, or a cellular phone.

In this scenario, the user acts as a witness and individual web sites are targets, identified by their DNS names. Once the user opens a web site on the browser, client device 450 sends a request for its reputation, which is then displayed on a prominent location on the screen. The user may then decide whether the web site should be trusted, for example, to provide valid information. Client device 450 may also provide a popup window or another user interface element to allow the user to submit a testimony for the web site.

Another example of a client device is a cellular phone. The owner of the phone acts as a witness and callers are targets, identified by their phone numbers. When the phone receives a call from an unknown number, the client device sends a request for caller reputation, which is then shown on the phone's display. The user may then decide whether to answer the call or to interact with the caller in other ways. After the call is completed, the user may submit a testimony for the caller.

Reputation server 452 is a centralized service operated by a trusted third party, comprising of one or more electronic devices implementing four basic components: database for storing the reputation data, data collection from known sources, data processing for computing reputations, and reputation service for handling requests from client devices. The database component may be implemented using any storage device capable of recording data in a non-volatile manner. For example, any industry standard relational database software running on a suitable computer fulfills these requirements.

The data collection component can be implemented using one or more electronic devices, which are capable of accessing the database and receiving data from a given set of known sources. The data collection component may either poll the known sources for new data in regular intervals or it may simply wait for a transmission from the known source, depending on the type of the source. Upon receiving new data, the data collection component may parse the collected data to filter out any parts deemed unnecessary for the reputation server, and store the resulting data to the database.

The data processing component may be implemented using one or more electronic devices, which are capable of accessing the database. The data processing component reads collected data and testimonies from the database, pre-processes the read data and testimonies, processes the collected information to compute possible automatic testimonies for targets, general reputation and confidence for targets in each application area, and profile-specific reputation and confidence for each {witness, target} pair, and stores the computed data to the database. Any or all of these steps may be executed in parallel or serialized, depending on the implementation of the data processing component.

The data processing components may be either run continuously or initiated in regular intervals. Upon starting a new round of processing, the data processing component reads all data and testimonies collected after the previous round from the database, and starts pre-processing it. During the pre-processing phase, the data processing component may discard any collected data deemed unnecessary or originating from a witness deemed unreliable. Also, depending on the prevalent identifier system, the data processing component may combine any equivalent target names. For example, if two identifiers point to the same physical target, the data processing component may consider them to be equivalent and combine them to a single identifier for the physical target. This can be the case, for example, in DNS names, where www1.example.com and www2.example.com can both point to the same network service.

After the pre-processing phase is completed, the data processing component analyzes the reputation requests from client devices stored in the database. If a witness consistently interacts with a target without giving a testimony for the target's reputation, the data processing component may insert an automatic testimony to the database for the witness, acknowledging that the witness approves the current reputation estimate for the target or considers the target reputation to be above average. If at any later time the witness submits a testimony for the target, any automatic testimonies for the target will be discarded by the data processing component.

The data processing component employs one or more statistical algorithms to compute the general reputation and confidence for a target in an application area. The general reputation and confidence are basically determined by data collected from known sources, the estimated accuracy of the known source and the freshness of the collected data, testimonies given by witnesses, the estimated reputation of the witness and the freshness of the testimony, and the possible hierarchy of the target identifier system.

The accuracy of the known sources is estimated by the trusted third party operating the reputation server. The freshness of the collected data is determined by the time it was collected; new data is considered fresher and thus more reliable than old data. The data processing component may discard any collected data it considers too old or originating from an unreliable source.

The data processing component estimates the reputation for each witness based on their observed behavior. For example, testimonies of a witness with an extended history and a consistent testimony behavior may be considered more reliable than those of a witness with a shorter history or inconsistent testimony behavior. The data processing component may also employ any number of heuristics to detect witnesses attempting to manipulate the system and completely discard their testimonies when computing reputations. The freshness of a testimony is determined by the time it was given, and it is refreshed each time the witness either updates the testimony or requests the reputation for the target; fresh testimonies are considered more reliable than older testimonies. The data processing component may discard any collected testimony it considers too old or originating from an unreliable witness. Therefore, the reputation and confidence may be computed from only a part of all received testimonies, typically from only the ones deemed most reliable.

If the target identifier scheme is hierarchical, the data processing component may make use of the hierarchy when computing the reputation and confidence. For example, the reputation of an ancestor in the hierarchy may affect the reputation of all its descendants. Similarly, the reputation of a descendant may have an effect on the reputation of the targets surrounding it in the hierarchy. For example, DNS names are hierarchical, with the same physical entity controlling the root domain (e.g. example.com). Thus, the reputation of the target host1.example.com may affect the reputation of another host in the same hierarchy, for example, host2.example.com, and vice versa. It should be noted that the depth of the naming hierarchy is not limited to the shown examples, but the data processing component may traverse the hierarchy to any depth when computing the reputation and confidence for a target.

After computing the general reputation and confidence for each target, the data processing component may also compute profile-specific reputation and confidence for each {witness, target} pair to enhance the accuracy of the reputation data for a specific witness. This may be desirable when the variance in the witness preferences and the number of available targets is large. The data processing component uses one or more statistical algorithms to analyze the behavior of witnesses, creates a profile for each witness, and groups like-minded witnesses into a set of friends. The data processing component may then compute a profile-specific reputation and confidence for each {witness, target} pair, where the testimonies from the set of friends are considered more reliable than the testimonies from other witnesses or the data collected from known sources. The data processing component may also consider the reputation of each witness and discard any unreliable witnesses from the set of friends.

The reputation service component may be implemented using one or more electronic devices connected to the network, which are capable of accessing the database. The reputation service component receives possible registration requests as illustrated with arrow 401, reputation requests as illustrated with arrow 403, and testimonies, as illustrated with arrow 405, from the client device over the network and handles them accordingly.

Client device 450 sends a registration request 401 to reputation server 452. In a reply message 402, reputation server reputation server 452 provides witness identifier and authentication data to client device 450.

Upon receiving a reputation request 403 from client device 450 for a target's reputation in one or more application areas, the reputation service component in reputation server 452 authenticates the request using the witness identifier and authentication data in the request, stores the valid request to the database for later processing (e.g. automatic testimonies), looks up witness's earlier testimonies for the target in given application areas from the database, looks up the target's general reputation and confidence in given application areas from the database, looks up witness's profile-specific reputation and confidence for the target in given application areas from the database, combines the general and profile-specific reputation and confidence using one or more statistical algorithms to compute the final pair {reputation, confidence} for the pair {witness, target} in each given application area, and transmits the final reputation data and possible earlier testimonies as tuple {reputation, confidence, testimony} in each given application area back to the client device as illustrated with arrow 404.

Upon receiving a testimony 405 for a target's reputation from client device 450, the reputation service component in reputation server 452 authenticates the testimony using the witness identifier and authentication data in the testimony, stores the valid testimony in the database for later processing, and acknowledges the testimony by transmitting a response 406 to the client device.

The invention is typically implemented as separate software or software plug-in that is attached to the browser software the user is using. For example, a simple display element can be attached to the toolbar of the browser. This element displays the reputation estimate for the current site. If the current site is suspicious or un-trusted, the software can launch a pop up icon for notifying the user. Similarly, the user can vote for the site by using the same software or plug-in. If the user does not vote but still uses the site continuously, the system automatically decides that the site is trusted and gives a vote for reliability. If the user later wants to change the vote, the changing is done by normally voting. The system then removes the previous vote.

In one embodiment of the invention, the system determines that the user uses the site continuously, if certain threshold values exceed a predefined level. A first such threshold value is the number of pages opened from a site during a browsing session. A second such threshold is the time interval between the opening of a first page from the site and a second page. If the time interval is too short, the user is deemed not to have viewed the first page. The time interval may be normalized to be dependent on the content type of the page. This means that a page comprising merely images is assigned a shorter time interval than a page containing a lot of text. A third such threshold is the number of browsing sessions on the page from the user. The number of browsing sessions may be reinitialized to zero after a longer time interval such as one year has elapsed. A fourth such threshold is the number of streaming sessions initiated from the page, the number of programs downloaded from the page or any files processed in a separate plug-in component. The fourth threshold may be set to, for example, one or two so that they have a higher emphasis than other thresholds. The first three thresholds may have a Boolean AND-condition between them so that the exceeding of the first, the second and the third threshold is required for deeming that the user uses the site continuously and that the site is considered trusted by the user implicitly. The fourth threshold may override the first, the second and the third threshold and cause trust to be determined. In this embodiment the user may also override the implicit trust determined automatically and select that the site is considered not trusted.

It is obvious to a person skilled in the art that with the advancement of technology, the basic idea of the invention may be implemented in various ways. The invention and its embodiments are thus not limited to the examples described above; instead they may vary within the scope of the claims. Certain embodiments of the invention include one or more computer programs embodied on a computer-readable storage medium. A computer readable storage medium may include volatile and/or non-volatile memory devices such read-only memory devices, hard disks, optical discs, random access memory devices, and flash memory devices.

The invention claimed is:

1. A method comprising:
   contacting a web service;
   contacting a reputation server;
   determining whether a user uses the web service continuously, said continuous use being determined based on a number of pages opened during a browsing session from the web service, a time interval between the opening of a first page from the web service and a second page, and a number of browsing sessions to the web service, said time interval being shorter for pages comprising merely images than for pages comprising text;
   estimating automatically a reputation opinion for the web service when the user uses the web service continuously; and
   storing reputation information in the reputation server.

2. The method according to claim 1, wherein the reputation server is a trusted third party.

3. A computer program embodied on a non-transitory computer readable storage medium, the computer program configured to control a processor to perform operations comprising:
   contacting a web service;
   contacting a reputation server;
   determining whether a user uses the web service continuously, said continuous use being determined based on a number of pages opened during a browsing session from the web service, a time interval between the opening of a first page from the web service and a second page, and a number of browsing sessions to the web service, said time interval being shorter for pages comprising merely images than for pages comprising text;

estimating automatically a reputation opinion for the web service when the user uses the web service continuously; and storing reputation information in the reputation server.

4. An apparatus, comprising:

a processor; and a memory including computer program code, wherein the memory and the computer program code are configured to, with the processor, cause the apparatus at least to contact a web service, contact a reputation server, determine whether a user uses the web service continuously, said continuous use being determined based on a number of pages opened during a browsing session from the web service, a time interval between the opening of a first page from the web service and a second page, and a number of browsing sessions to the web service, said time interval being shorter for pages comprising merely images than for pages comprising text, estimate automatically a reputation opinion for the web service when the user uses the web service continuously, and store reputation information in the reputation server.

5. The apparatus of claim 4, wherein the reputation server is a trusted third party.

\* \* \* \* \*